(12) United States Patent
Englin et al.

(10) Patent No.: US 6,857,049 B1
(45) Date of Patent: Feb. 15, 2005

(54) METHOD FOR MANAGING FLUSHES WITH THE CACHE

(75) Inventors: Donald C. Englin, Shoreview, MN (US); Kelvin S. Vartti, Hugo, MN (US); James L. Federici, Lino Lakes, MN (US)

(73) Assignee: Unisys Corporation, Blue Bell, PA (US)

( * ) Notice: Subject to any disclaimer, the term of this patent is extended or adjusted under 35 U.S.C. 154(b) by 352 days.

(21) Appl. No.: 09/651,488

(22) Filed: Aug. 30, 2000

(51) Int. Cl.[7] .............................................. G06F 12/00
(52) U.S. Cl. ..................... 711/135; 711/122; 711/142; 711/143
(58) Field of Search ..................... 711/120–124, 159, 711/133, 142–145, 135, 156, 165, 118

(56) References Cited

U.S. PATENT DOCUMENTS

| | | | |
|---|---|---|---|
| 4,349,871 A | 9/1982 | Lary | 364/200 |
| 4,442,487 A | 4/1984 | Fletcher et al. | 364/200 |
| 4,525,777 A | 6/1985 | Webster et al. | 364/200 |
| 4,755,930 A | 7/1988 | Wilson, Jr. et al. | 364/200 |
| 4,794,521 A | 12/1988 | Ziegler et al. | 364/200 |
| 4,843,542 A | 6/1989 | Dashiell et al. | 364/200 |
| 4,860,192 A | 8/1989 | Sachs et al. | 364/200 |
| 5,023,776 A | 6/1991 | Gregor | 364/200 |
| 5,025,365 A | 6/1991 | Mathur et al. | 364/200 |
| 5,025,366 A | 6/1991 | Baror | 364/200 |
| 5,276,848 A * | 1/1994 | Gallagher et al. | 711/121 |
| 5,386,547 A * | 1/1995 | Jouppi | 711/122 |
| 5,426,754 A * | 6/1995 | Grice et al. | 711/124 |
| 5,548,742 A * | 8/1996 | Wang et al. | 711/128 |
| 5,551,001 A * | 8/1996 | Cohen et al. | 711/122 |
| 6,081,872 A * | 6/2000 | Matick et al. | 711/122 |
| 6,314,491 B1 * | 11/2001 | Freerksen et al. | 711/124 |
| 6,385,695 B1 * | 5/2002 | Arimilli et al. | 711/122 |
| 6,418,515 B1 * | 7/2002 | Kurosawa | 711/135 |
| 6,460,114 B1 * | 10/2002 | Jeddeloh | 711/120 |

* cited by examiner

*Primary Examiner*—Pierre M. Vital
(74) *Attorney, Agent, or Firm*—Charles A. Johnson; Mark T. Starr; Nawrocki, Rooney & Sivertson, P.A.

(57) ABSTRACT

A method of and apparatus for improving the efficiency of a data processing system employing a multiple level cache memory system. The efficiencies result from managing the process of flushing old data from the second level cache memory. In the present invention, the second level cache memory is a store-in memory. Therefore, when data is to be deleted from the second level cache memory, a determination is made whether the data has been modified by the processor. If the data has been modified, the data must be rewritten to lower level memory. To free the second level cache memory for storage of the newly requested data, the data to be flush is loaded into a flush buffer for storage during the rewriting process.

6 Claims, 5 Drawing Sheets

METHOD FOR MANAGING FLUSHES WITH THE CACHE

CROSS REFERENCE TO CO-PENDING APPLICATIONS

The present application is related to co-pending U.S. patent application Ser. No. 09/626030, filed Jul. 27, 2000, entitled Cooperative Hardware and Microcode Control System for Pipelined Instruction Execution; U.S. Pat. Application Serial No. 08/650,800, filed Aug. 30, 2000, entitled Method for Improved First Level Cache Coherency; U.S. Pat. Application Ser. No. 09/651,597, filed Aug. 30, 2000, entitled Method for Avoiding Delays During SNOOP Requests; U.S. Pat. Application Ser. No. 09/650,730, filed Aug. 30, 2000, entitled Leaky Cache Mechanism; and U.S. Pat. Application Ser. No. 08/235,196, filed, Apr. 29, 1994, entitled Data Coherency Protocol for Multi-level Cached High Performance Multiprocessor System, assigned to the assignee of the present invention and incorporated herein by reference.

BACKGROUND OF THE INVENTION

1. Field of the Invention: —The present invention relates generally to data processing systems employing multiple instruction processors and more particularly relates to multiprocessor data processing systems employing multiple levels of cache memory.

2. Description of the Prior Art: —It is known in the art that the use of multiple instruction processors operating out of common memory can produce problems associated with the processing of obsolete memory data by a first processor after that memory data has been updated by a second processor. The first attempts at solving this problem tended to use logic to lock processors out of memory spaces being updated. Though this is appropriate for rudimentary applications, as systems become more complex, the additional hardware and/or operating time required for the setting and releasing of locks can not be justified, except for security purposes. Furthermore, reliance on such locks directly prohibits certain types of applications such as parallel processing.

The use of hierarchical memory systems tends to further compound the problem of data obsolescence. U.S. Pat. No. 4,056,844 issued to Izumi shows a rather early approach to a solution. The system of Izumi utilizes a buffer memory dedicated to each of the processors in the system. Each processor accesses a buffer address array to determine if a particular data element is present in its buffer memory. An additional bit is added to the buffer address array to indicate invalidity of the corresponding data stored in the buffer memory. A set invalidity bit indicates that the main storage has been altered at that location since loading of the buffer memory. The validity bits are set in accordance with the memory store cycle of each processor.

U.S. Pat. No. 4,349,871 issued to Lary describes a bussed architecture having multiple processing elements, each having a dedicated cache memory. According to the Lary design, each processing unit manages its own cache by monitoring the memory bus. Any invalidation of locally stored data is tagged to prevent use of obsolete data. The overhead associated with this approach is partially mitigated by the use of special purpose hardware and through interleaving the validity determination with memory accesses within the pipeline. Interleaving of invalidity determination is also employed in U.S. Pat. No. 4,525,777 issued to Webster et al.

Similar bussed approaches are shown in U.S. Pat. No. 4,843,542 issued to Dashiell et al, and in U.S. Pat. No. 4,755,930 issued to Wilson, Jr. et al. In employing each of these techniques, the individual processor has primary responsibility for monitoring the memory bus to maintain currency of its own cache data. U.S. Pat. No. 4,860,192 issued to Sachs et al, also employs a bussed architecture but partitions the local cache memory into instruction and operand modules.

U.S. Pat. No. 5,025,365 issued to Mathur et al, provides a much enhanced architecture for the basic bussed approach. In Mathur et al, as with the other bussed systems, each processing element has a dedicated cache resource. Similarly, the cache resource is responsible for monitoring the system bus for any collateral memory accesses which would invalidate local data. Mathur et al, provide a special snooping protocol which improves system throughput by updating local directories at times not necessarily coincident with cache accesses. Coherency is assured by the timing and protocol of the bus in conjunction with timing of the operation of the processing element.

An approach to the design of an integrated cache chip is shown in U.S. Pat. No. 5,025,366 issued to Baror. This device provides the cache memory and the control circuitry in a single package. The technique lends itself primarily to bussed architectures. U.S. Pat. No. 4,794,521 issued to Ziegler et al, shows a similar approach on a larger scale. The Ziegler et al, design permits an individual cache to interleave requests from multiple processors. This design resolves the data obsolescence issue by not dedicating cache memory to individual processors. Unfortunately, this provides a performance penalty in many applications because it tends to produce queuing of requests at a given cache module.

The use of a hierarchical memory system in a multiprocessor environment is also shown in U.S. Pat. No. 4,442,487 issued to Fletcher et al. In this approach, each processor has dedicated and shared caches at both the L1 or level closest to the processor and at the L2 or intermediate level. Memory is managed by permitting more than one processor to operate upon a single data block only when that data block is placed in shared cache. Data blocks in dedicated or private cache are essentially locked out until placed within a shared memory element. System level memory management is accomplished by a storage control element through which all requests to shared main memory (i.e. L3 level) are routed. An apparent improvement to this approach is shown in U.S. Pat. No. 4,807,110 issued to Pomerene et al. This improvement provides prefetching of data through the use of a shadow directory.

A further improvement to Fletcher et al, is seen in U.S. Pat. No. 5,023,776 issued to Gregor. In this system, performance can be enhanced through the use of store around L1 caches used along with special write buffers at the L2 intermediate level. This approach appears to require substantial additional hardware and entails yet more functions for the system storage controller.

Inherent in architectures which employ cache memory, is that the storage capacity is substantially less than the memory located at lower levels in the hierarchy. As a result, memory locations within the cache memory must often be cleared for use by other data quantities more recently needed by the instruction processor. For store-in cache memories, this means that those quantities modified by the instruction processor must first be rewritten to system memory before the corresponding location is available to store newly requested data. This "flushing" process tends to delay the availability of the newly requested data.

SUMMARY OF THE INVENTION

The present invention overcomes the problems found in the prior art by providing a method of and apparatus for improving the efficiency of cache memory within a system. This enhancement to efficiency is accomplished through a novel technique for managing the flushing process.

The preferred mode of the present invention includes up to four main memory storage units. Each is coupled directly to each of up to four "pod"s. Each pod contains a level three cache memory coupled to each of the main memory storage units. Each pod may also accommodate up to two input/output modules.

Each pod may contain up to two sub-pods, wherein each sub-pod may contain up to two instruction processors. Each instruction processor has two separate level one cache memories (one for instructions and one for operands) coupled through a dedicated system controller, having a second level cache memory, to the level three cache memory of the pod.

Unlike many prior art systems, both level one and level two cache memories are dedicated to an instruction processor within the preferred mode of the present invention. The level one cache memories are of two types. Each instruction processor has an instruction cache memory and an operand cache memory. The instruction cache memory is a read-only cache memory primarily having sequential access. The level one operand cache memory has read/write capability. In the read mode, it functions much as the level one instruction cache memory. In the write mode, it is a semi-store-in cache memory, because the level two cache memory is also dedicated to the instruction processor.

In accordance with the present invention, the level two cache memory is of the store-in type. Therefore, the most current value of an operand which is modified by the corresponding instruction processor is first located within the level two cache memory. When the replacement algorithm for the level two cache memory determines that the location of that operand must be made available for newly requested data, that operand must be "flushed" into the lower level memory to avoid a loss of the most current value.

Waiting for flushing of the old data before requesting the new data induces unacceptable latency. Therefore, according to the present invention, a flush buffer is provided for temporary storage of the old data during the flushing process. Though this temporary storage appears at first to be a mere extension to the level two storage capacity, it greatly enhances efficiency because the flush process really does not need to utilize the level two cache memory.

The old data is moved from the level two cache memory to the flush buffer as soon as the replacement algorithm has determined which data to move, and the newly requested data is requested from the lower level memory. The flush process subsequently occurs from the flush buffer to the lower level of memory without further reference to the level two cache. Furthermore, locations within the level two cache memory are made available for the newly requested data well before that data has been made available from the lower level memory.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
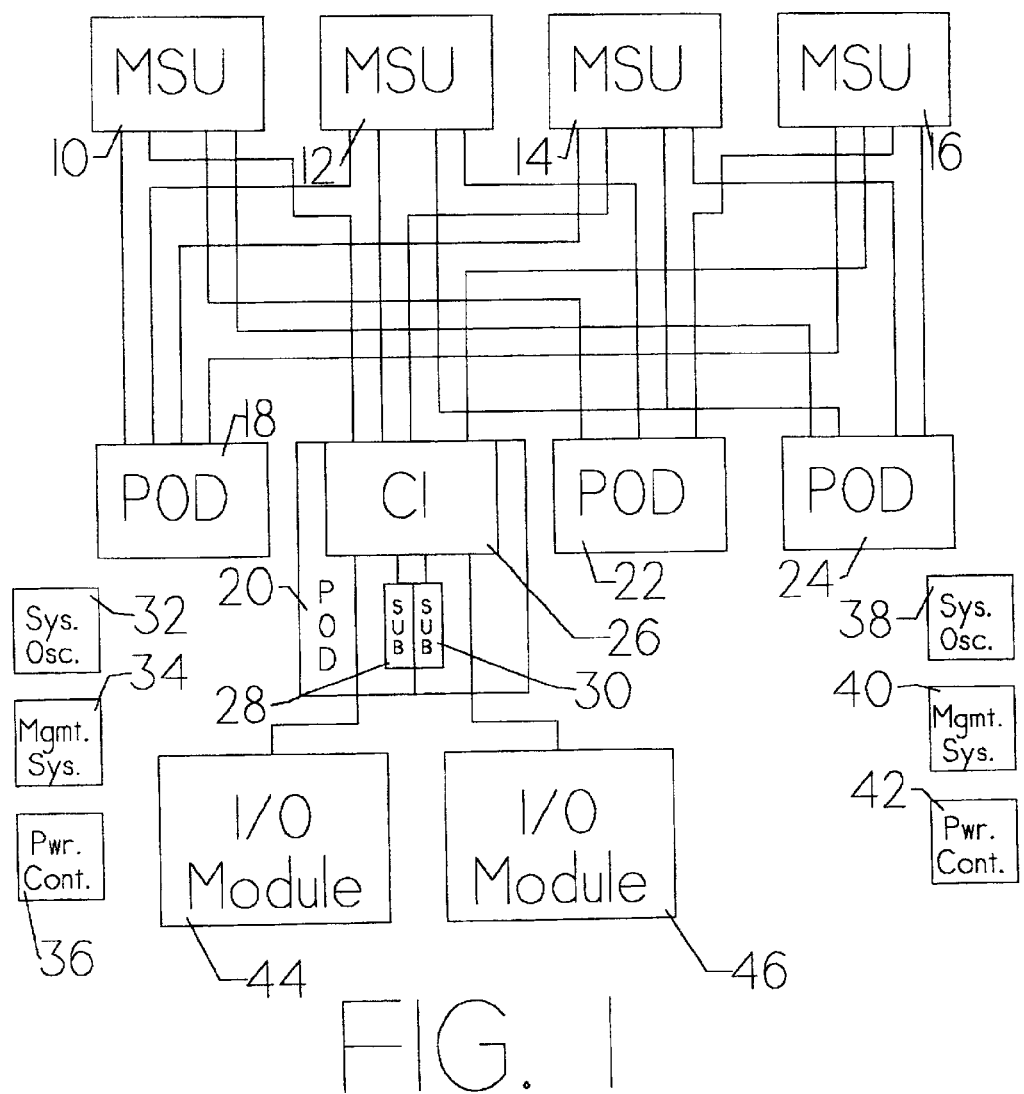
FIG. 1 is an overall block diagram of a fully populated system in accordance with the present invention.

FIG. 1 is an overall block diagram of fully populated data processing system according to the preferred mode of the present invention. This corresponds to the architecture of a commercial system of Unisys Corporation termed "Voyager".

The main memory of the system consists of up to four memory storage units, MSU 10, MSU 12, MSU 14, and MSU 16. Being fully modular, each of these four memory storage units is "stand-alone" and independent of one another. Each has a separate point-to-point dedicated bi-directional interface with up to four "pods", POD 18, POD 20, POD 22, POD 24. Again, each of the up to four pods is separate and independent of one another.

The contents of POD 20 are shown by way of example. For the fully populated system, POD 18, POD 22, and POD 24 are identical to POD 20. The interface between POD 20 and each of the four memory storage units (i.e., MSU 10, MSU 12, MSU 14, and MSU 16), is via a third level cache memory designated cached interface, CI 26, in this view. CI 26 couples with two input/output controllers, I/O Module 44 and I/O Module 46, and two sub-pods, SUB 28 and SUB 30. A more detailed explanation of the POD 20 is provided below.

The above described components are the major data handling elements of the system. In the fully populated system shown, there are sufficient components of each type, such that no single hardware failure will render the complete system inoperative. The software employed within the preferred mode of the present system utilizes these multiple components to provide enhanced reliability for long term operation.

The remaining system components are utilitarian rather than data handling. System Oscillator 32 is the primary system time and clocking standard. Management System 34 controls system testing, maintenance, and configuration. Power Controller 36 provides the required electrical power. System Oscillator 38, Management System 40, and Power Controller 42 provide completely redundant backup capability.

Figure 2:
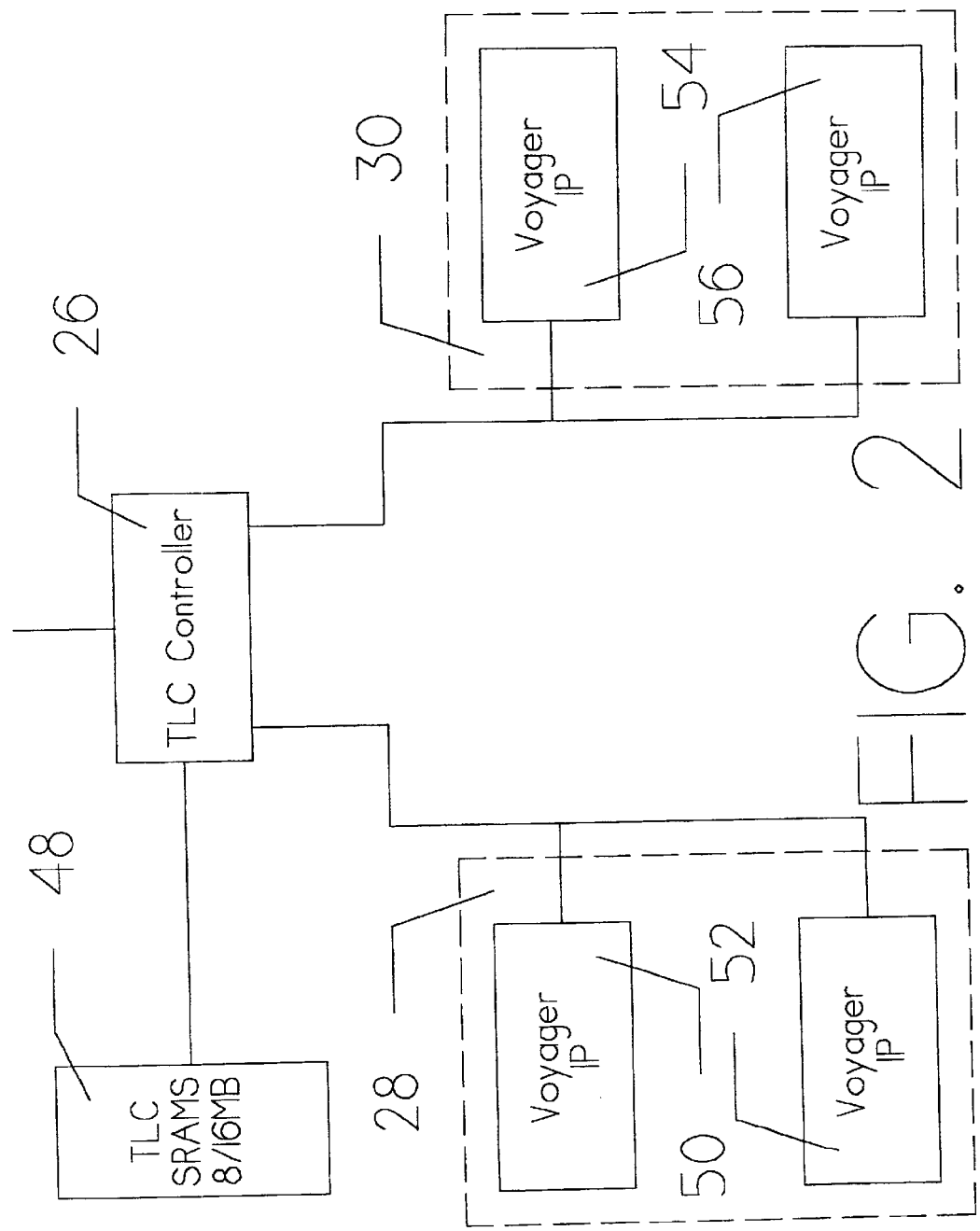
FIG. 2 is a schematic block diagram of one pod.

FIG. 2 is a more detailed block diagram of POD 20. The level three cache memory interfaces directly with the memory storage units via TLC Controller 26 (see also FIG. 1). The actual storage for the level three cache memory is TLC SRAMS 48. As indicated this static random access memory consists of eight 16 byte memory chips.

Subpod 28 and subpod 30 each contain up to two individual instruction processors. These are designated Voyager IP 50, Voyager IP 52, Voyager IP 54, and Voyager IP 56. As explained in detail below, each contains its own system controller. In accordance with the preferred mode of the present invention, these instruction processors need not all contain an identical software architecture.

Figure 3:
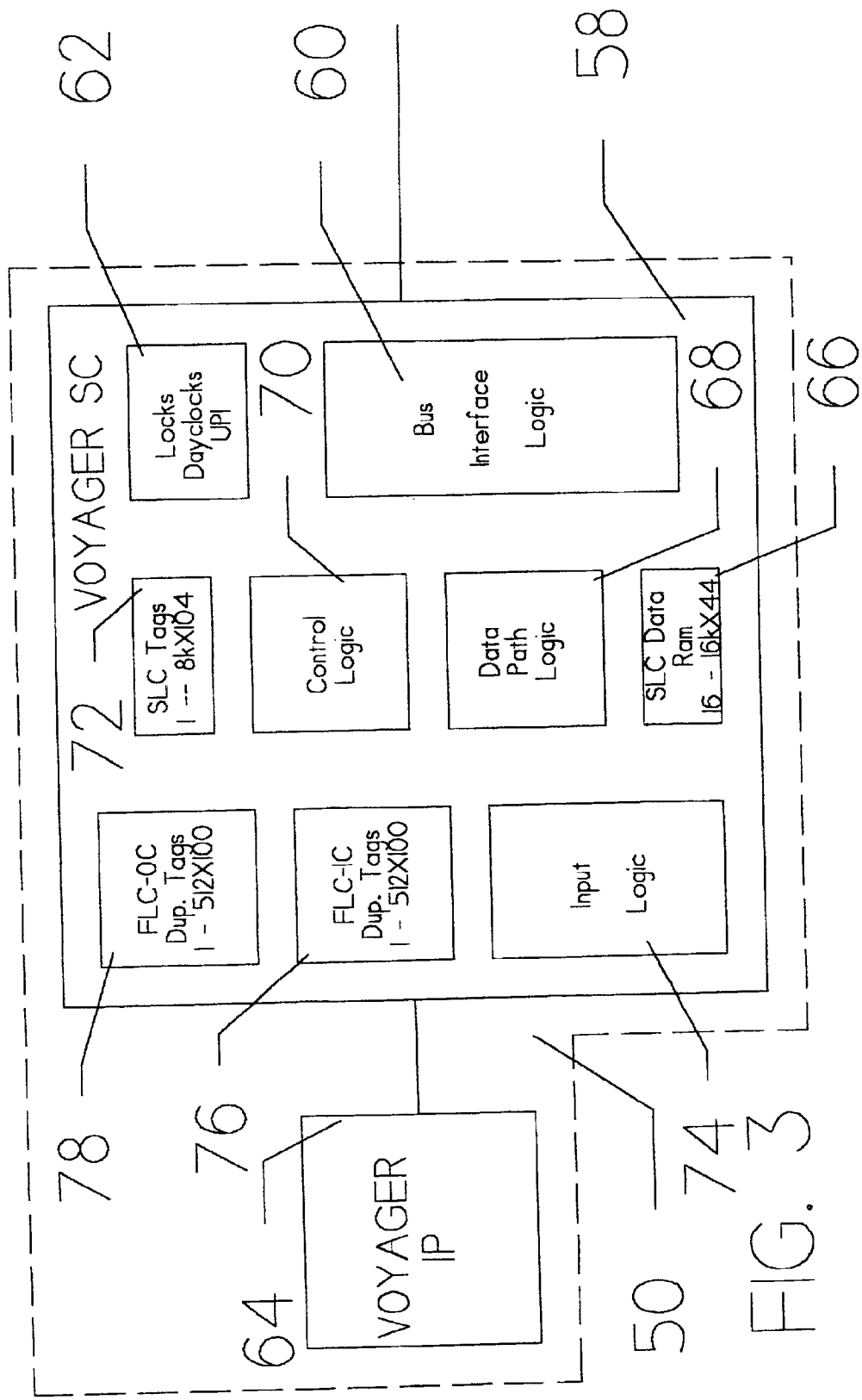
FIG. 3 is a schematic block diagram of one instruction processor along with its dedicated system controller.

FIG. 3 is a more detailed block diagram of Voyager IP 50, located within Subpod 28, located within POD 20 (see also FIGS. 1 and 2). As explained above, each instruction processor has a dedicated system controller having a dedicated level two cache memory. Instruction processor 64 has two dedicated level one cache memories (not shown in this view). One level one cache memory is a read-only memory for program instruction storage. Instruction processor 64 executes its instructions from this level one cache memory. The other level one cache memory (also not shown in this view) is a read/write memory for operand storage.

Instruction processor 64 is coupled via its two level one cache memories and dedicated system controller 58 to the remainder of the system. System controller 58 contains input logic 74 to interface with instruction processor 64. In addition, data path logic 70 controls movement of the data through system controller 58. The utilitarian functions are provided by Locks, Dayclocks, and UPI 62.

The remaining elements of system controller 58 provide the level two cache memory functions. SLC data ram 66 is the data actual storage facility. Control logic 70 provides the cache management function. SLC tags 72 are the tags associated with the level two cache memory. FLC-IC Dup. Tags 76 provides the duplicate tags for the level one instruction cache memory of instruction processor 64. Similarly, FLC-OC Dup. Tags 78 provides the duplicate tags for the level one operand cache memory of instruction processor 64. For a more complete discusses of this duplicate tag approach, reference may be made with the above identified co-pending and incorporated U.S. Pat. Applications.

Figure 4:
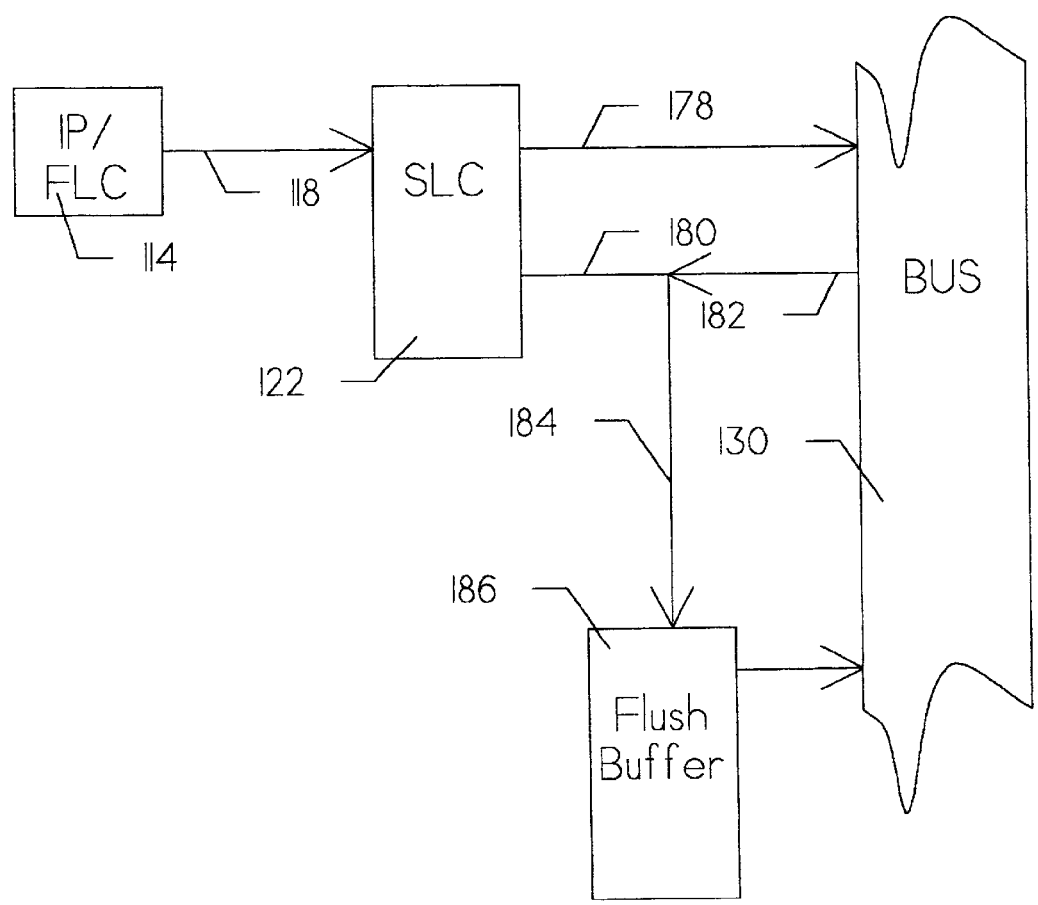
FIG. 4 is a detailed diagram of the flush process of the present invention.

FIG. 4 is a detailed functional diagram showing the flushing process of the preferred mode of the present invention. Following a level one cache memory miss, a data request is made from level one operand cache memory 114 of instruction processor 110 (see also FIG. 3). In accordance with the present invention, the data request is made on memory bus 118.

If the requested data is found within second level cache memory 122 (i.e., a cache hit), the data access occurs. However, if a cache miss occurs within second level cache memory 122 (i.e., the data is not present), a level three cache memory request is made via path 178 and memory bus 130. As soon as the data is available, it is transferred from memory bus 130 via path 180.

To provide a place to store the newly requested data, cache memory 122 may need to flush some older data, if all locations are full. The selection of which location(s) to flush is in accordance with a least recently used algorithm as modified in accordance with the above identified and incorporated co-pending patent applications. The data to be flushed is transferred to flush buffer 186 from which the data is rewritten to level three memory via bus 130. Because this data is flushed from level two cache memory 122 to flush buffer 186 before the rewrite can be accomplished, space becomes quickly available within level two cache memory 122 for accommodating the newly requested data as soon as available.

Figure 5:
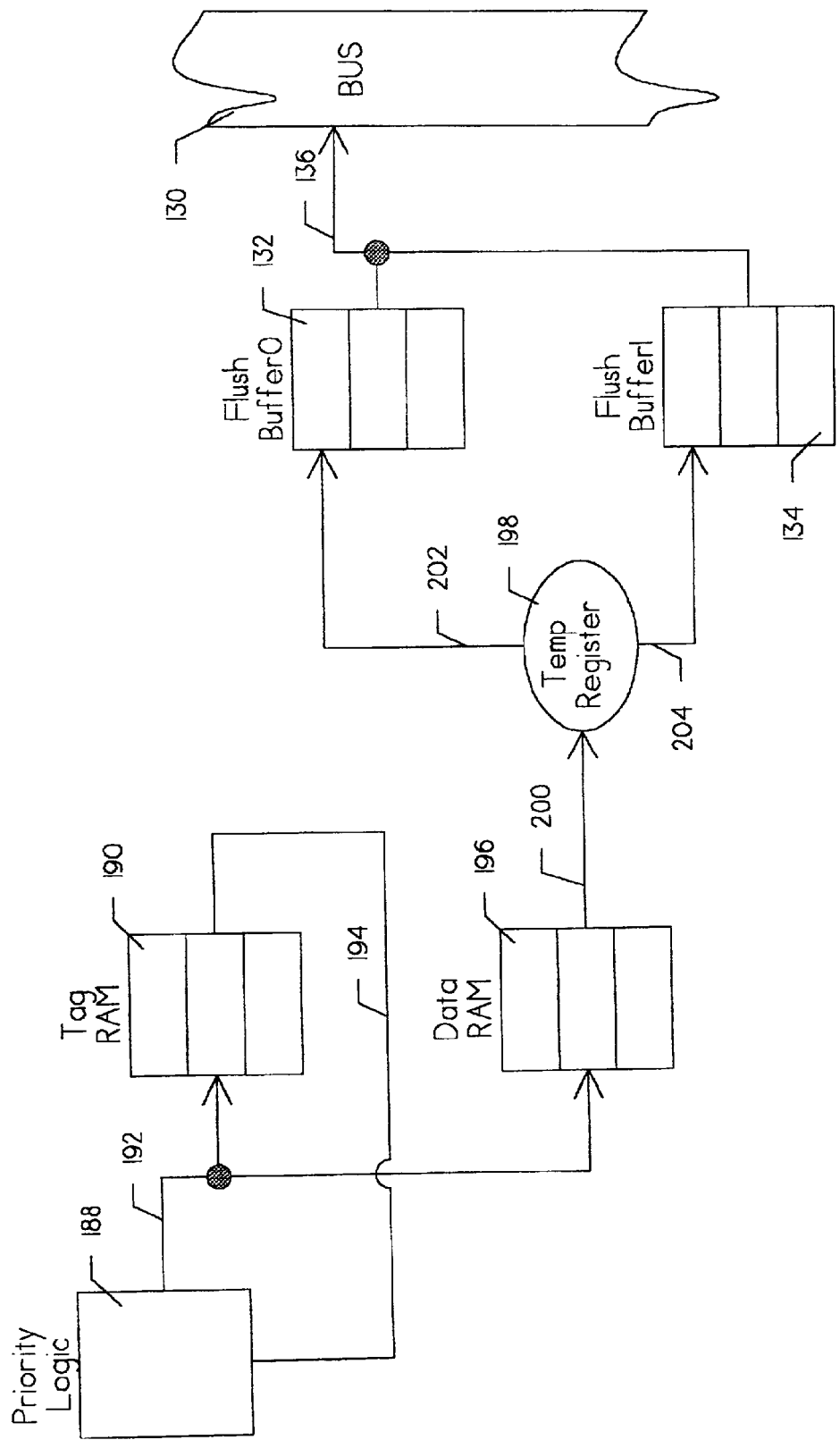
FIG. 5 is a detailed diagram showing the flush buffers of the present invention.

FIG. 5 is detailed diagram showing the data flow in accordance with the present invention. Upon being notified of a level two cache miss, priority logic 188 determines which locations are to be flushed. This selection is made in the manner discussed above. The location(s) to be flushed is communicated to tag RAM 190 and data RAM 196 via addressing path 192.

Access of tag RAM 190 provides a determination whether there has been any modification to the data within level two cache memory. If there has been no modification as noted within tag RAM 190, no further write operation to level three memory is required. If the data has been modified, however, path 194 notifies priority logic 188 that the modified data to be flushed must be rewritten to level three memory.

Assuming that a rewrite is necessary, the data is accessed from data RAM 196 and transferred via path 200 to temp register 198. Further latency is reduced by employing two flush buffers (i.e., flush buffer0 132 and flush buffer1 134) as shown. Temp register 198 routes the data to be rewritten to either flush buffer0 132 via path 202 or to flush buffer1 134 as each becomes available.

The data to be flushed is stored within the selected flush buffer while the rewriting process is accomplished. The data to transferred to level three memory via path 136 and bus 130.

Having thus described the preferred embodiments in sufficient detail for those of skill in the art to make and use the present invention, those of skill in the art will be readily able to apply the teachings found herein to yet other embodiments within the scope of the claims hereto attached.

We claim:

1. In a data processing system having a processor responsively coupled to a store-in cache memory which is responsively coupled to a lower level memory, the improvement comprising:

a. a read-only level one instruction cache memory directly coupled to said processor;

b. a store-through level one operand cache memory directly coupled to said processor;

c. wherein said processor is responsively coupled to said store-in cache memory via said read-only level one instruction cache memory and via said store-through level one operand cache memory;

d. a flush buffer directly coupled to said store-in cache memory and said lower level memory;

e. a tag memory responsively coupled to said store-in cache memory which indicates whether a particular location within said store-in memory has been modified by said processor;

f. a logic circuit which loads said flush buffer with data from said particular location within said store-in cache memory in response to said indication that said particular location within said store-in memory has been modified by said processor; and g. wherein said flush buffer further comprises a first flush buffer store having a first input responsively coupled to said store-in cache memory and a first output directly coupled to said lower level memory and a second flush buffer store having a second input responsively coupled to said store-in cache memory and a second output directly coupled to said lower level memory.

2. A data processing system according to claim 1 further comprising a temporary register responsively coupled to said store-in cache memory, said first flush buffer store, and said second flush buffer store which routes said data from said particular location to an available one of said first flush buffer store and said second flush buffer store.

3. A data processing system comprising:

a. A processor;

b. A level one store-through cache memory having a read-only instruction portion and an operand portion directly coupled to said processor;

c. A store-in cache memory responsively coupled to said processor via said read-only instruction portion and said operand portion of said level one store-through cache memory;

d. A lower level memory responsively coupled to said store-in cache memory;
e. A flush buffer directly coupled to said store-in cache memory and said lower level memory; and
f. wherein said flush buffer further comprises a first flush buffer store having a first input responsively coupled to said store-in cache memory and a first output directly coupled to said lower level memory and a second flush buffer store having a second input responsively coupled to said store-in cache memory and a second output directly coupled to said lower level memory.

4. A data processing system according to claim 3 further comprising:
   a. A temporary register responsively coupled to said store-in cache memory, said first flush buffer store, and said second flush buffer store.

5. A data processing system according to claim 4 further comprising:
   a. A tag memory responsively coupled to said store-in cache memory for indicating whether a particular location has been modified by said processor.

6. A data processing system according to claim 5 further comprising:
   a. A logic circuit responsively coupled to said tag memory, said store-in cache memory, and said temporary register which routes data from said particular location from said store-in cache memory to said temporary register when said indication is that said particular location has been modified by said processor.

* * * * *